(12) United States Patent
Kleinschuster (10) Patent No.: US 10,974,543 B2
(45) Date of Patent: Apr. 13, 2021

(54) VEHICLE WHEEL HAVING BARBED BEAD SEAT

(71) Applicant: Custom Wheel House, LLC, Santa Fe Springs, CA (US)

(72) Inventor: Sean J. Kleinschuster, Long Beach, CA (US)

(73) Assignee: Custom Wheel House, LLC, Santa Fe Springs, CA (US)

( * ) Notice: Subject to any disclaimer, the term of this patent is extended or adjusted under 35 U.S.C. 154(b) by 281 days.

(21) Appl. No.: 15/954,791

(22) Filed: Apr. 17, 2018

(65) Prior Publication Data
US 2019/0315159 A1    Oct. 17, 2019

(51) Int. Cl.
*B60B 21/10*    (2006.01)

(52) U.S. Cl.
CPC ...... *B60B 21/102* (2013.01); *B60B 2900/325* (2013.01); *B60B 2900/5116* (2013.01); *B60B 2900/523* (2013.01); *B60B 2900/711* (2013.01)

(58) Field of Classification Search
CPC .......................... B60B 21/102; B60C 15/0226
USPC ................................... 301/95.101; 152/379.5
See application file for complete search history.

(56) References Cited

U.S. PATENT DOCUMENTS

| 1,396,515 | A | * | 11/1921 | McClevey | B60C 15/0226 |
| | | | | | 152/384 |
| 3,977,727 | A | | 8/1976 | Glasenapp et al. | |
| 4,015,652 | A | | 4/1977 | Harris | |
| 4,151,870 | A | * | 5/1979 | Watts | B60C 15/0226 |
| | | | | | 152/375 |
| 4,190,092 | A | | 2/1980 | Evans et al. | |
| 4,325,422 | A | * | 4/1982 | Corner | B60B 21/10 |
| | | | | | 152/209.1 |
| 4,561,481 | A | * | 12/1985 | Kawauchi | B60B 21/10 |
| | | | | | 152/379.3 |
| 5,253,692 | A | * | 10/1993 | Stephens | B60C 15/0226 |
| | | | | | 152/543 |

(Continued)

FOREIGN PATENT DOCUMENTS

| CN | 203063554 U | | 7/2013 | |
| DE | 3236610 A1 | * | 4/1984 | ............ B60B 21/10 |

(Continued)

OTHER PUBLICATIONS

Written Opinion & International Search Report for PCT/US2019/016307 dated May 17, 2019, 12 pages.

(Continued)

*Primary Examiner* — Kip T Kotter
(74) *Attorney, Agent, or Firm* — Reising Ethington P.C.; Jeffrey L. Doyle (57) ABSTRACT

A vehicle wheel having a central axis. The wheel comprises a bead seat configured to engage a bead of a tire, the bead seat extending circumferentially about the central axis of the wheel. The bead seat comprises a first sidewall, a second sidewall, and a base extending between the first and second sidewalls. The first and second sidewalls extend radially outwardly from the base, and the base includes a radially outwardly-facing surface extending circumferentially about the central axis, and one or more barbs projecting from the radially outwardly-facing surface in a radially outwardly direction.

17 Claims, 8 Drawing Sheets

(56) References Cited

U.S. PATENT DOCUMENTS

| | | | |
|---|---|---|---|
| 5,279,347 A * | 1/1994 | Stephens | B60C 15/0226 152/379.5 |
| 6,814,114 B2 | 11/2004 | Bouvier et al. | |
| 8,973,632 B2 * | 3/2015 | Mancini | B60C 15/024 152/379.5 |
| 2003/0067213 A1 * | 4/2003 | Lin | B60B 5/02 301/64.704 |
| 2003/0098109 A1 * | 5/2003 | Bouvier | B60B 21/023 152/158 |
| 2015/0137584 A1 | 5/2015 | Chen | |

FOREIGN PATENT DOCUMENTS

| | | | | |
|---|---|---|---|---|
| FR | 2874536 A1 | | 3/2006 | |
| GB | 2008504 A | * | 6/1979 | ........... B60C 15/024 |
| JP | 05139106 A | * | 6/1993 | |
| JP | 2007331605 A | * | 12/2007 | |
| JP | 2007331605 A | | 12/2007 | |
| JP | 2013063695 A | | 4/2013 | |
| WO | WO0125030 A1 | | 4/2001 | |

OTHER PUBLICATIONS

Preliminary Report on Patentability for PCT/US2019/016307 dated Oct. 29, 2020, 9 pages.

\* cited by examiner

VEHICLE WHEEL HAVING BARBED BEAD SEAT

TECHNICAL FIELD

The present disclosure relates generally to a vehicle wheel and more particularly to a vehicle wheel having barbs extending from a surface of a bead seat of the vehicle wheel to prevent disengagement of a tire mounted to the vehicle wheel.

BACKGROUND

It is known that vehicle wheels may include a bead seat designed to engage a bead of a tire mounted on the wheel. These wheels may include, for example, wheels for motor vehicles (e.g., automobiles, trucks, vans, sports utility vehicles, all-terrain vehicles, off-road vehicles, buses, utility vehicles, rally vehicles, motorcycles, etc.) and wheels for aircraft. The air pressure between the tire and the wheel can aid in holding the bead seat of the wheel and the bead of the tire together. When air pressure is low, there is typically a greater chance that the tire will become disengaged from the wheel, which can cause a variety of problems. However, due to the design of many vehicle wheels, and wheels for motor vehicles, in particular, a large amount of force or friction is required to disengage the bead of the tire from the bead seat of the wheel.

Nonetheless, some vehicles are operated under conditions in which a relatively high amount of axial stress or force relative to the axis of rotation of the wheel may be applied to the tire, which can cause the bead of the tire to move relative to the bead seat of the wheel. The combination of high axial stress and low tire pressure can result in an increased likelihood of disengagement of the tire. For example, vehicles configured for off-road racing are typically driven at fast speeds and can include lower tire pressure so as to achieve more traction between the tire and the terrain or surface being traversed. The fast speeds of these vehicles can cause high axial stress and, in combination with lower tire pressure, the bead of the tire may become disengaged from the bead seat of the wheel. Disengagement of the tire bead from the bead seat can result in, for example, an undesirable loss of tire pressure.

SUMMARY

According to one embodiment, there is provided a vehicle wheel having a central axis. The wheel comprises a bead seat configured to engage a bead of a tire, the bead seat extending circumferentially about the central axis of the wheel. The bead seat comprises a first sidewall, a second sidewall, and a base extending between the first and second sidewalls. The first and second sidewalls extend radially outwardly from the base, and the base includes a radially outwardly-facing surface extending circumferentially about the central axis, and one or more barbs projecting from the radially outwardly-facing surface in a radially outwardly direction.

According to another embodiment, there is provided a vehicle wheel having a central axis. The wheel comprises a bead seat configured to engage a bead of a tire, the bead seat extending circumferentially about the central axis of the wheel. The bead seat comprises a first sidewall, a second sidewall, and a base extending between the first and second sidewalls. The first and second sidewalls extend radially outwardly from the base, and the base includes a radially outwardly-facing surface extending circumferentially about the central axis, and a plurality of barbs projecting from the radially outwardly-facing surface in a radially outwardly direction.

According to another embodiment, there is provided a vehicle wheel having a central axis. The wheel comprises a bead seat configured to engage a bead of a tire, the bead seat extending circumferentially about the central axis. The bead seat includes a radially outwardly-facing surface extending circumferentially about the central axis of the wheel, and one or more barbs projecting from the radially outwardly-facing surface in a radially outwardly direction.

BRIEF DESCRIPTION OF DRAWINGS

One or more embodiments of the invention will hereinafter be described in conjunction with the appended drawings, wherein like designations denote like elements, and wherein.

DETAILED DESCRIPTION

The disclosure below enables a tire to be more securely engaged with a vehicle wheel along an interface between a bead of the tire and a bead seat of the wheel. In at least some embodiments, one or more barbs are provided on the bead seat of the wheel such that, when a tire is mounted on the wheel and the bead of the tire is engaged with the bead seat of the wheel, the barbs engage the bead of the tire and aids in preventing disengagement of the tire bead from the bead seat. For example, during high speed, off-road vehicle racing, the tire can be forced in different directions and at different magnitudes of force due to the momentum of the body of the vehicle and the friction between the earth (i.e., terrain or surface being traversed) and the tire. In some scenarios, these conditions cause a relatively high amount of axial stress or force (relative to the axis of rotation of the wheel) to be applied to the tire, which can sometimes result in the bead of the tire becoming disengaged from the bead seat of the wheel. To prevent or at least aid in preventing such disengagement, at least one barb is provided on the bead seat of the wheel and is configured to engage the bead of the tire to create a mechanical fit between the bead and bead seat, and to secure the bead to the bead seat thereby limiting or restricting movement of the bead relative to the bead seat. As those skilled in the art will appreciate, the term "barb" or its other forms used herein refers to a projection that may include various geometries, including saw-tooth geometries, spike geometries, grooved geometries, hook geometries, and/or various other suitable geometries as made apparent in light of the discussion below.

Figure 1:
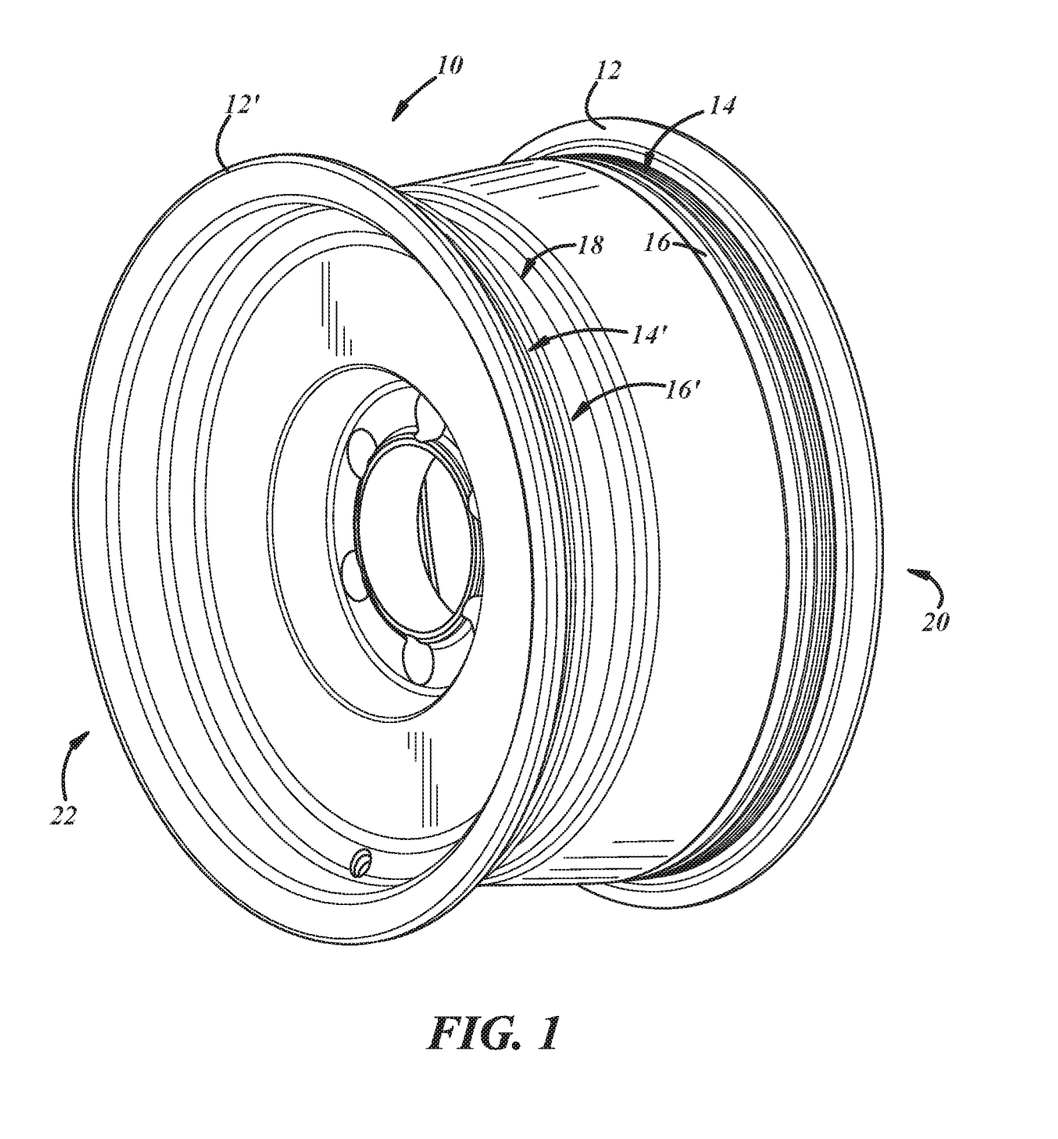
FIG. 1 is an isometric view of an illustrative embodiment of a motor vehicle wheel.
Figure 2:
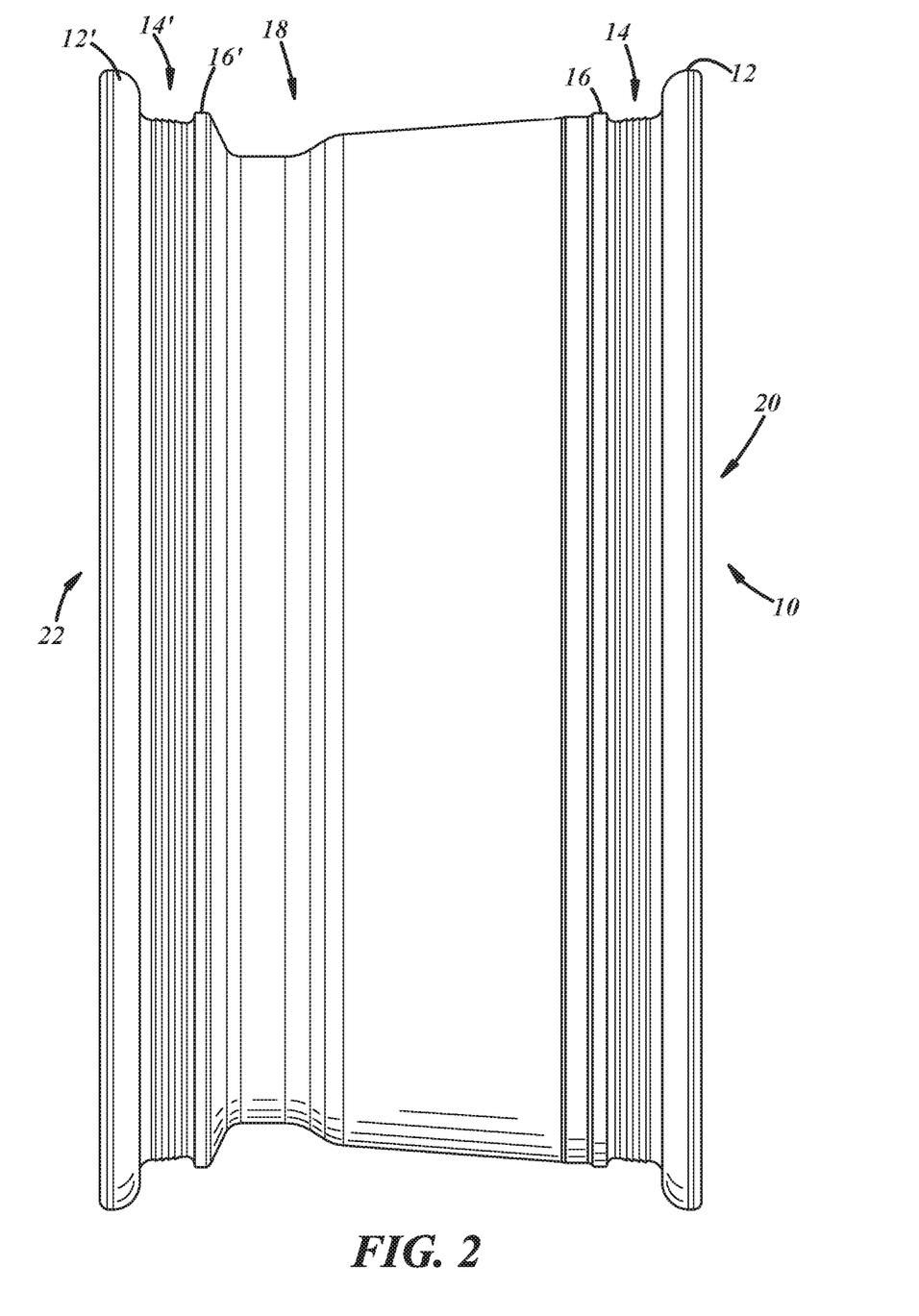
FIG. 2 is a side view of the motor vehicle wheel illustrated in FIG. 1.

FIGS. 1 and 2 depict an illustrative embodiment of a motor vehicle wheel 10. As is well known in the art, the wheel 10 includes first and second outer flanges 12, 12', first and second bead seats 14, 14', first and second retaining humps 16, 16', a tire well 18, a back face 20, and a front face 22. In an illustrative embodiment, the wheel 10 may comprise a wheel for use with one or more different types of a motor vehicles (e.g., automobiles, trucks, vans, sports utility vehicles, buses, all-terrain vehicles, off-road vehicles, utility vehicles, rally vehicles, etc.). In another illustrative embodiment, the wheel 10 may comprise a wheel for use with an aircraft or other type(s) of vehicles having, for example, one or more wheels on which a pneumatic or air-filled tire may be mounted. Accordingly, it will be appreciated that the present disclosure is not intended to be limited to wheels for any particular application. For purposes of brevity and clarity, however, the description below will be primarily with respect to a wheel comprising a motor vehicle wheel for use with one or more of commercial or passenger motor vehicles, which may include a variety of automobiles, trucks, vans, sports utility vehicles, buses, all-terrain vehicles, off-road vehicles, utility vehicles, rally vehicles, motorcycles, and other like vehicles. Further, in an illustrative embodiment, the wheel 10 comprises an alloy wheel that includes aluminum and/or magnesium alloys. However, it will be appreciated by those of ordinary skill in the art that various alternative or additional materials, for example, different types of steels, metals, metal alloys, and other suitable materials, can certainly be used in the manufacture of the wheel. Also, various processes can be used to produce the wheel 10, including, but not limited to, die casting, forging, and other suitable processes; and the wheel can also be machined so as to achieve a desired shape or to define certain features of the wheel 10.

Figure 3:
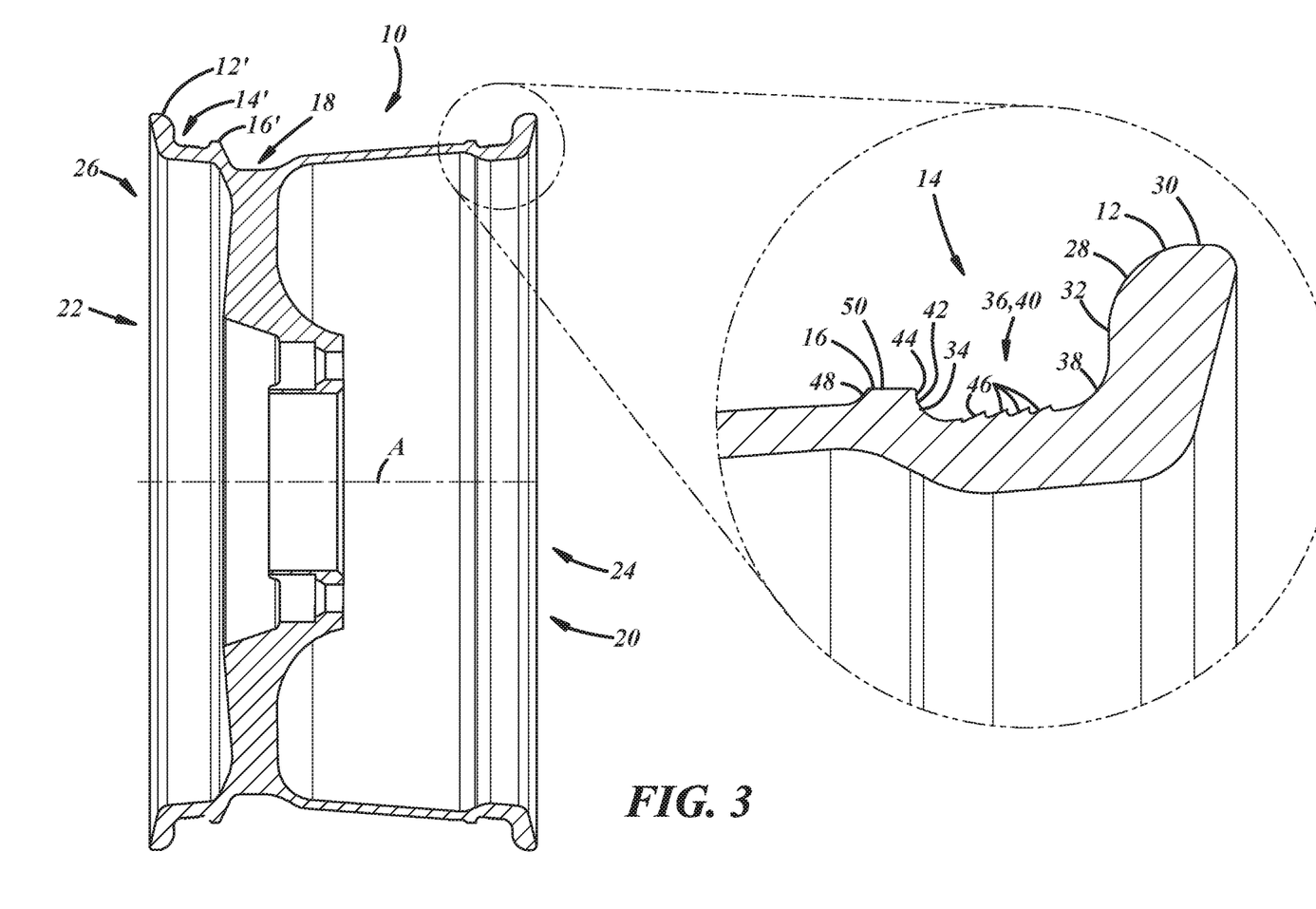
FIG. 3 is a cross-sectional view of an illustrative embodiment of a motor vehicle wheel and includes an enlarged cross-sectional view of an outer portion of the motor vehicle wheel.

FIG. 3 depicts a cross-section of an illustrative embodiment of the wheel 10 and includes an enlarged cross-sectional depiction of an outer portion of the wheel 10. As mentioned above, the wheel 10 includes first and second outer flanges 12, 12', first and second bead seats 14, 14', first and second retaining humps 16, 16', and the tire well 18, all of which extend circumferentially around a central axis A of the wheel (also referred to herein as the axis of rotation of the wheel), which will be used as the reference axis for all directional descriptions herein. The wheel 10 further includes the back face 20 and the front face 22 that face axially outwardly from the wheel 10 relative to the central axis A in opposite directions.

As shown in FIG. 3, the first outer flange 12, first bead seat 14, and first retaining hump 16 are located or disposed at a first axially outer portion of the wheel 10 that, in turn, is located at or near a first axial end 24 of the wheel 10 where the back face 20 of the wheel 10 is also located. The second outer flange 12', second bead seat 14', and second retaining hump 16' are located or disposed at a second axially outer portion of the wheel 10 that, in turn, is located at or near a second axial end 26 of the wheel opposite the first axial end 24 where the front face 22 of the wheel 10 is also located. The first and second outer portions of the wheel 10 are separated at least in part by the tire well 18, and thus, the first and second outer portions and the first and second axial ends of the wheel 10 are axially spaced along the central axis A. For purposes of clarity and brevity, the description below will be primarily with respect to the first outer flange 12, first bead seat 14, and first retaining hump 16 of the wheel 10 and features and components thereof. It will be appreciated, however, that except as otherwise described herein, the description below applies with equal weight to the second outer flange 12', second bead seat 14', and second retaining hump 16' of the wheel 10 and features and components thereof.

In the illustrative embodiment shown in FIG. 3, the outer flange 12 includes, in part, an axially inwardly-facing flange wall 28 (i.e., facing toward the second axial end 26 of the wheel 10) and a radially outwardly-facing surface 30 (i.e., facing away from the body of the wheel 10). In other embodiments, in addition to facing axially inwardly, a portion of the flange wall 28 may also face radially outwardly (as shown in FIG. 3) or radially inwardly. And in addition to facing radially outwardly, a portion of the surface 30 may also face axially inwardly or axially outwardly. Accordingly, the surface 30 can extend parallel, or at least generally or substantially parallel, to the central axial axis A. In an embodiment, the surface 30 merges into the flange wall 28 as the surface 30 extends axially inwardly (i.e., along the central axial axis A and toward the second axial end 26 of the wheel 10). The flange wall 28 is also located radially inwardly from the axially outermost edge of the surface 30, and the merged portion between the flange wall 28 and the surface 30 may be rounded or curved (i.e., radiused), or alternatively may form a straight edge therebetween. In an illustrative embodiment, the flange wall 28 comprises a sidewall portion of the bead seat 14. For example, in the embodiment illustrated in FIG. 3, as the flange wall 28 extends axially inwardly and away from the surface 30, the flange wall 28 merges into a radially outwardly-facing surface of the bead seat 14.

In the illustrative embodiment depicted in FIG. 3, the bead seat 14 of the wheel 10 is shown as being located axially inwardly of the outer flange 12, as well as radially inwardly from the surface 30 of the outer flange 12. The bead seat 14 comprises a first sidewall 32, a second sidewall 34, and a base 36 disposed therebetween. In the embodiment illustrated in FIG. 3, the first sidewall 32 defines or includes an axially outermost bead seat surface 38. In an embodiment, the outermost bead seat surface 38 comprises an axially inwardly-facing surface (i.e., facing towards the retaining hump 16), while in another embodiment the surface 38 faces both axially inwardly and radially outwardly away from the body of the wheel 10. The base 36 defines or includes a central bead seat surface 40, which will be described in greater detail below. And the second sidewall 34 defines or includes an axially innermost bead seat surface 42. In an embodiment, the innermost bead seat surface 42 comprises an axially outwardly-facing surface (i.e., facing towards the outer flange 12), while in another embodiment the surface 42 faces both axially outwardly and radially outwardly away from the body of the wheel 10. In any event, the beat seat 14 is configured to receive a bead of tire, and the outermost bead seat surface 38, the central bead seat surface 40, and the innermost bead seat surface 42 are configured to engage respective portions/surfaces of the tire bead.

In an embodiment, the first and second sidewalls 32, 34 extend radially outwardly from the base 36. The first sidewall 32 may comprise at least a portion of the flange wall 28 of the outer flange 12, or may comprise a wall that is separate from the outer flange 12. The second sidewall 34 may comprise at least a portion of the retaining hump 16, for example, an axially outwardly facing wall 44 of the retaining hump 16, or may comprise a wall separate from the retaining hump 16.

The base 36 and the central bead seat surface 40 thereof in particular extends axially between the first and second sidewalls 32, 34, and between the axially outermost bead seat surface 38 and the axially innermost bead seat surface 42. More specifically, the central bead seat surface 40 extends between the first and second sidewalls 32, 34 at the radially innermost ends of the first and second sidewalls 32, 34. In an embodiment, one or both of the points at which the first and second sidewalls 32, 34 meet the base 36 may be radiused so as to substantially complement the shape of a tire bead to be seated in the bead seat 14. The present disclosure is not intended to be limited to such an embodiment, however.

In an embodiment, the central bead seat surface 40 comprises a radially outwardly facing surface, whereas in other embodiments, the central bead seat surface 40 faces both radially outwardly and either axially inwardly or alternatively axially outwardly. In addition to the base and sidewalls, the bead seat 14 further includes one or more barbs 46 that, in one illustrative embodiment, extend or project from the central bead seat surface 40 in a radially outwardly direction, and in another illustrative embodiment, in a radially outwardly direction and either an axially outwardly or axially inwardly direction. In the embodiment illustrated in FIG. 3, the bead seat includes four (4) barbs. It will be appreciated, however, that the present disclosure is not intended to be limited to any particular number of barbs, but rather embodiments wherein the bead seat includes less than four barbs (e.g., 1, 2, or 3 barbs) or more than four barbs remain within the spirit and scope of the present disclosure.

Figure 8:
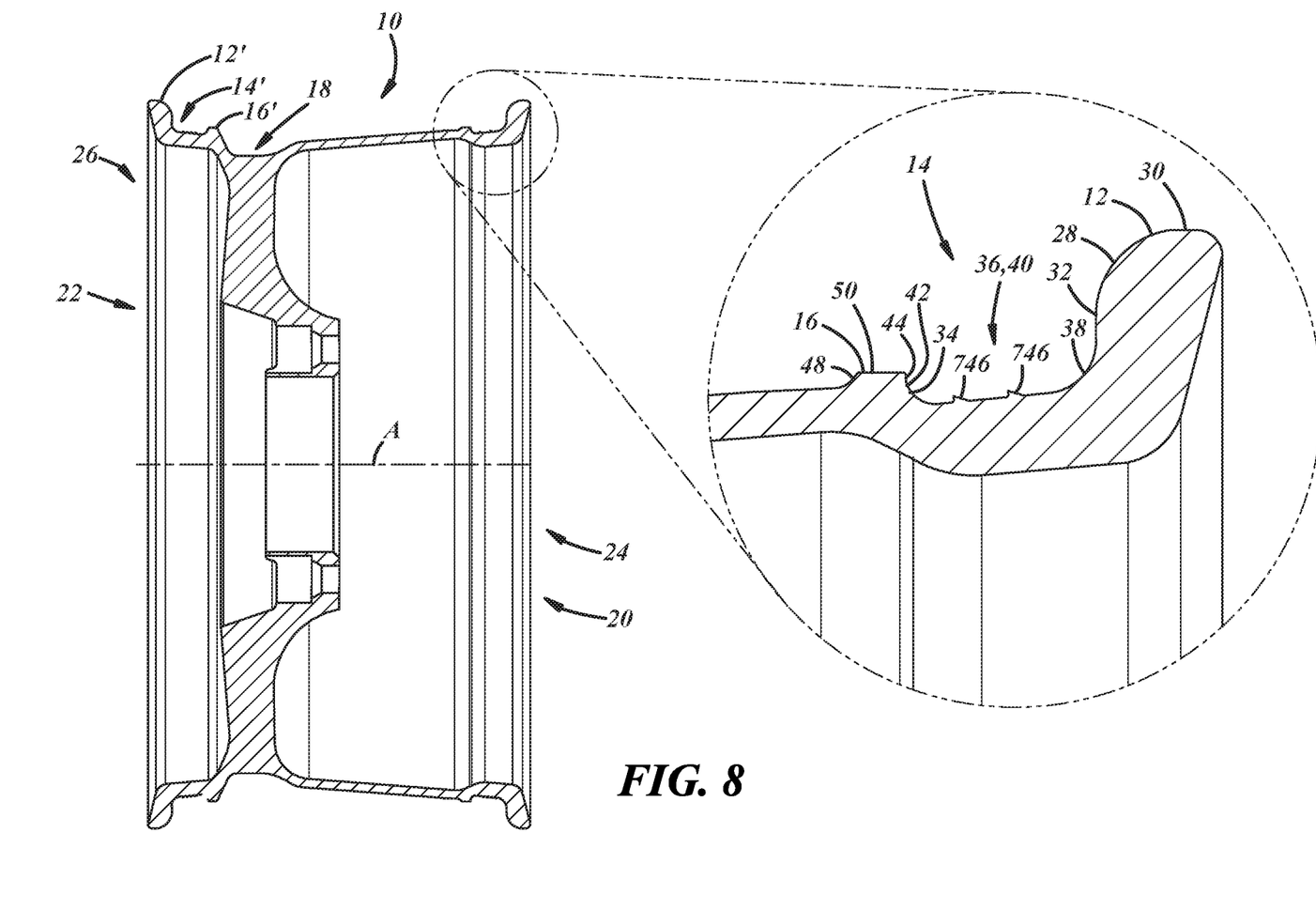
FIG. 8 is a cross-sectional view of an illustrative embodiment of a motor vehicle wheel and includes an enlarged cross-sectional view of an outer portion of the motor vehicle wheel.

In an embodiment, one or more barbs 46 extend or project towards the outermost bead seat surface 38 (i.e., towards the sidewall 32). In another embodiment, one or more barbs 746 may extend toward the innermost bead seat surface 42 (i.e., towards the sidewall 34). In yet another embodiment, such as, for example, that illustrated in FIG. 8, one or more barbs 46 may extend toward the outermost bead seat surface 38, while one or more other barbs 746 may extend toward the innermost bead seat surface 42.

The retaining hump 16 includes an axially outwardly-facing retaining hump wall 44, an axially inwardly-facing retaining hump wall 48, and a surface 50 extending therebetween. The axially outwardly-facing retaining hump wall 44 may run perpendicular (or substantially perpendicular) to central axial axis A, or may run at an angle that is transverse to the central axis A. That is, in at least some embodiments, the axially outwardly-facing wall 44 may also face radially outwardly. In an embodiment, at least a portion of the axially outwardly facing retaining hump wall 44 comprises the second sidewall 34 of the bead seat 14.

The retaining hump 16 is provided to prevent or at least limit the disengagement of a bead of a tire from the bead seat 14 of the wheel 10. The retaining hump 16 is located axially inwardly of the bead seat 14, while the outer flange 12 is located axially outwardly of the bead seat 14. As such, and as described above, at least a portion of one or both of the retaining hump 16 (i.e., the outwardly facing hump wall 46) and the outer flange 12 (i.e., the inwardly-facing flange wall 28) may comprise the sidewalls of the bead seat 14.

As described above, and with reference to FIG. 4, the bead seat 14 of the wheel 10 includes at least one barb 46 extending or projecting from the central bead seat surface 40 thereof. When a bead of a tire is inserted into the bead seat 14 such that the bead seat 14 and the tire bead are engaged with one another, one or more interfaces are formed between the tire bead and the bead seat that act to hold the bead of the tire within and against the bead seat 14. The one or more interfaces may include interfaces between the tire bead and one or more of the outermost bead seat surface 38, the central bead seat surface 40, and the innermost bead seat surface 42.

Figure 4:
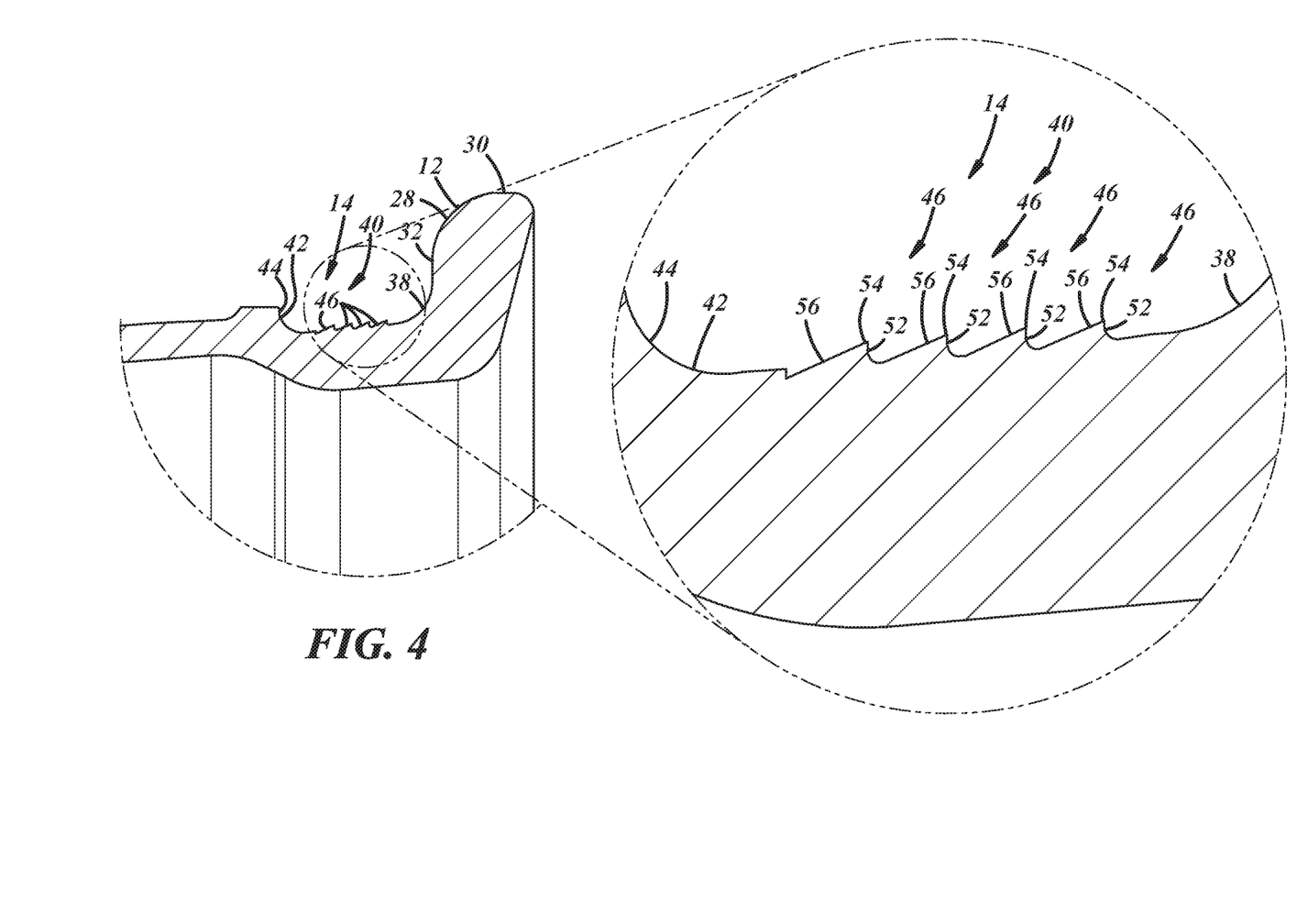
FIG. 4 is a cross-sectional view of the outer portion of the motor vehicle wheel illustrated in FIG. 3 and includes an enlarged cross-sectional view of a bead seat of the motor vehicle wheel.

As mentioned above, although the geometries and arrangements of the outer flange 12, the bead seat 14, and the retaining hump 16 are intended to hold the bead of the tire against or within the bead seat 14, high vehicle speeds may cause a relatively large amount of force to be applied between the bead of the tire and the bead seat 14, possibly resulting in the bead of the tire becoming disengaged from the bead seat 14. In view of this, the barb(s) 46 is/are provided in an orientation such that one or more of the barb(s) 46 extend from the central bead seat surface 40 in both a radially outwardly and axially outwardly direction towards the outer flange 12 (or first sidewall 32 of the bead seat 14) so that when a force is applied to the tire in an axial direction away from the flange wall 28 and towards the retaining hump 16, the barb penetrates into and engages the tire bead. As shown in FIG. 4, the barb 46 may include an engagement surface 52, which, in an embodiment, may include an outer barb corner 54. The engagement of the barb(s) 46 and the tire bead serves to prevent or at least limit movement of the bead of the tire relative to the bead seat 14, and serves to prevent or at least limit the tire bead from overcoming the retaining hump 16 resulting in disengagement of the tire bead from the bead seat 14. In another embodiment, rather than the barbs 46 extending in both a radially outwardly and axially outwardly direction, some or all of the barbs may extend only in a radially outwardly direction, and/or some or all of the barbs may extend in a radially outwardly and axially inwardly direction towards the second sidewall 34 of the bead seat 14 (best shown in FIG. 8). Accordingly, various arrangements and orientations of the barb(s) are possible.

The barb(s) 46 may be made of a variety of materials and, in at least some embodiments, may be formed of the same material as the other parts of the wheel 10. For example, the wheel 10 may be machined so as to form at least one barb 46 thereon (i.e., the barb 46 is integrally formed with the wheel 10 or at least the bead seat 14/central bead seat surface 40 of the wheel 10). Thus, in at least one embodiment, the wheel 10, including the bead seat 14, is constructed of a metal alloy and then a machining process is performed on the wheel 10 to form the desired number of barbs 46 on or in the bead seat 14. In other embodiments, however, the barb(s) 46 may not be integrally formed on or in the bead seat 14, but rather may be affixed or otherwise attached to the wheel 10 by, for example, using one or more known adhesives, fasteners, and/or welding or riveting techniques.

Figure 7:
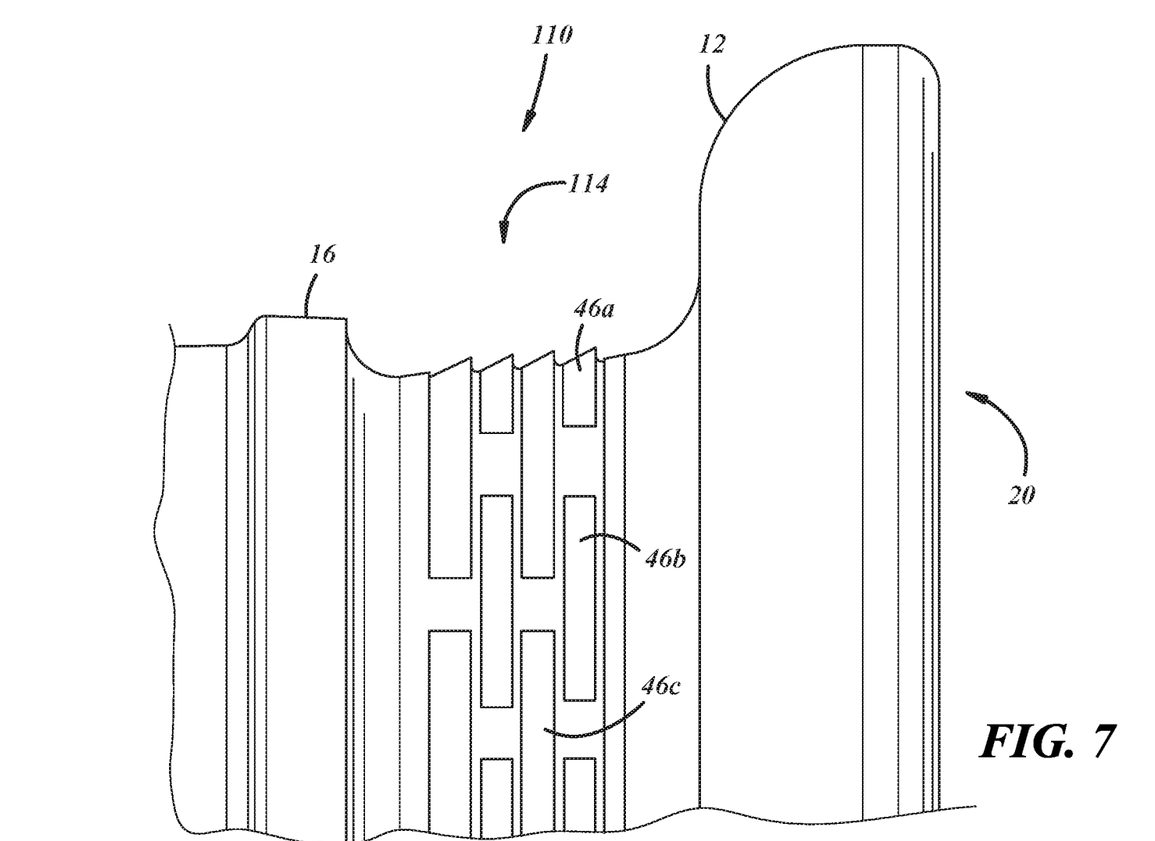
FIG. 7 is a side elevational view of a portion of an outer portion of a motor vehicle wheel having a bead seat with a plurality of circumferentially and/or axially spaced barbs projecting from a surface thereof.

As shown in FIGS. 1 and 2, in an embodiment, the barbs 46 extend circumferentially about the wheel 10 along the central bead seat surface 40. In an embodiment, the barbs 46 may be circumferentially continuous, while in other embodiments one or more of the barbs 46 may be circumferentially discontinuous. Further, in an embodiment, the barbs 46 may extend circumferentially along the entirety of the central bead seat surface 40 (see, for example, FIGS. 1 and 2), while in other embodiments one or more of the barbs may not extend along the entirety of the surface 40 (see, for example, the embodiment of the wheel (wheel 110) and the bead seat (bead seat 114) thereof, in particular, shown in FIG. 7). As illustrated in FIG. 4, in an embodiment wherein there are multiple barbs 46, two or more of the barbs 46 may be axially spaced apart. In another embodiment, such as, for example, that shown in FIG. 7, two or more barbs may be additionally or alternatively circumferentially spaced apart (e.g., barbs 46a, 46b, and 46c are all circumferentially spaced apart, while bards 46a and 46c are also axially spaced apart). In either instance, the barbs 46 may be equally spaced or alternatively may be unequally spaced. Additionally, in at least one embodiment, at least one barb 46 is located at the halfway point between first and second sidewalls 32, 34. Accordingly, the present disclosure is not intended to be limited to any particular barb arrangement(s) or configuration(s); rather any number of arrangements and configurations may be used.

While the description thus far has been with respect to the barbs 46 extending or projecting from the central bead seat surface 40, in other embodiments, one or more barbs may alternatively or additionally extend or project from the outermost bead seat surface 38 and/or the innermost bead seat surface 42.

The barb 46 may have any number of shapes or geometries designed or configured to resist an axially inwardly applied force on the bead of the tire with respect to the bead seat 14 of the wheel 10 so that the bead of the tire does not disengage from the bead seat and possibly travel over the retaining hump 16 (or at least the outermost retaining hump wall 46). As such, when a force is exerted on or applied to the bead of the tire in a direction away from the outer flange 12 and towards the retaining hump 16, one or more outer surfaces of the bead engage with the barb(s) 46, and movement of the bead relative to the bead seat 14 is prevented or at least constrained.

Figure 5:
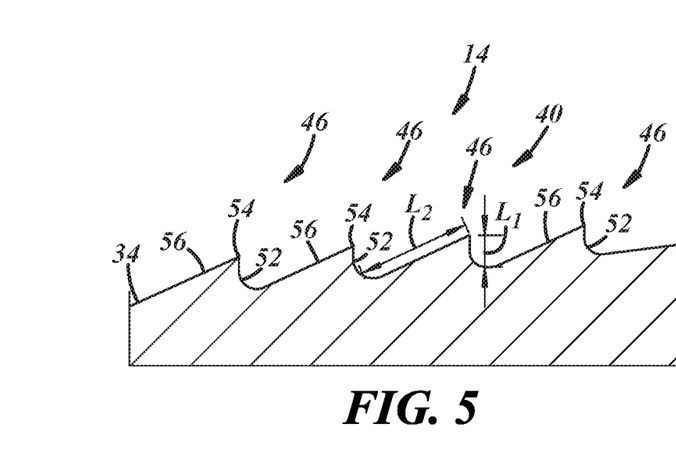
FIG. 5 is a cross-sectional view of a portion of a bead seat of a motor vehicle wheel and includes an enlarged cross-sectional view of a barb projecting from a surface of the bead seat.

In an illustrative embodiment such as that illustrated in FIGS. 4 and 5, one or more of the barbs 46 may have a generally sawtooth geometry or cross-sectional shape. In such an embodiment, each of the barb(s) 46 may include a first surface 52 and a second surface 56 that meet at an outer barb corner 54 radially outwardly of the central bead seat surface 40. In an embodiment, the second surface 56 comprises a ramp surface that faces both axially inwardly (i.e., toward the retaining hump 16) and radially outwardly (i.e., away from the body of the wheel), and that extends in an axially outwardly (i.e., away from the retaining hump 16 and towards the flange 12) and radially outwardly direction from the central bead seat surface 40 to the outer barb corner 54 of the barb 46.

Figure 6A:
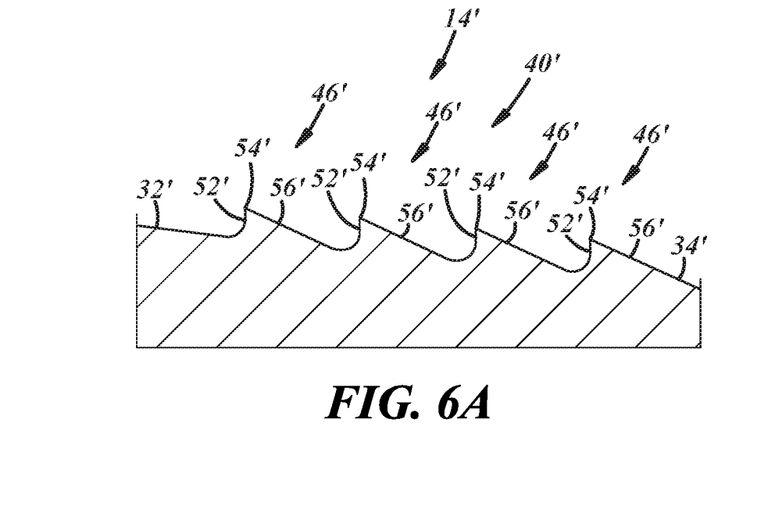
FIGS. 6A-6F each depict a cross-sectional view of a portion of a bead seat of a motor vehicle wheel, and each depicts a different illustrative embodiment of barbs extending from a surface of the beat seat.
Figure 6B:
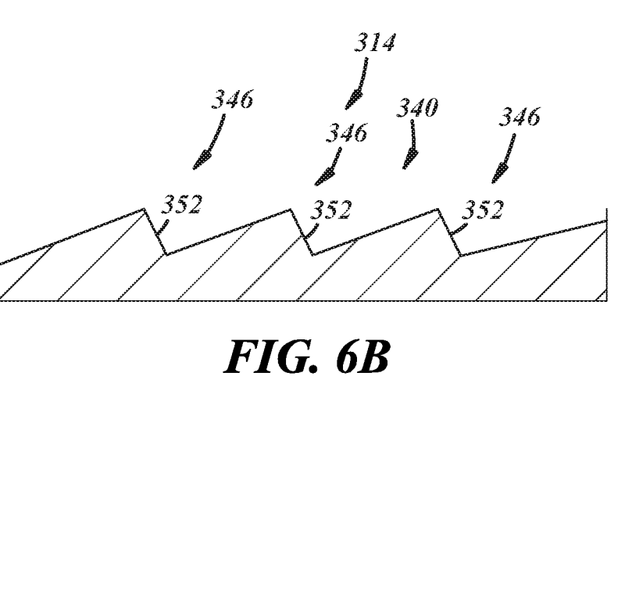
Figure 6C:
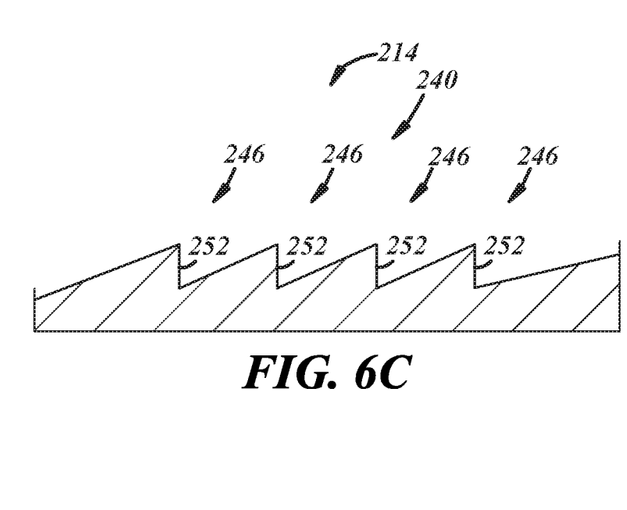
Figure 6D:
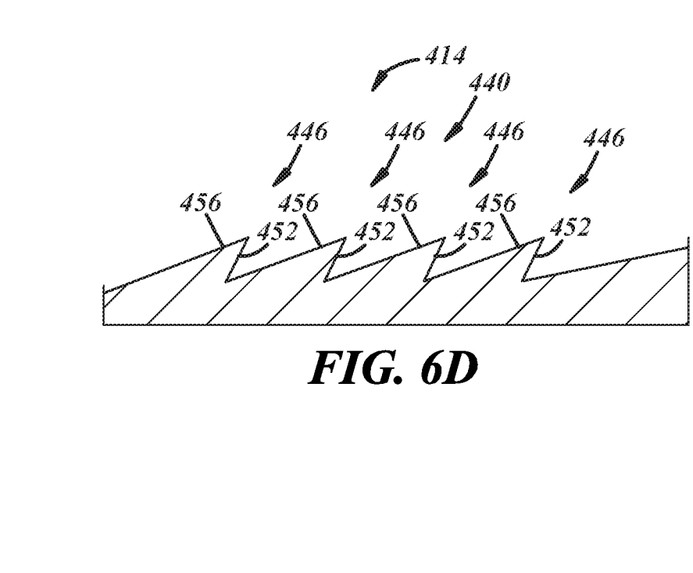

As shown in FIGS. 5 and 6C, the first surface 52 (or a first surface 252 of a barb 246 shown in FIG. 6C) may comprise an axially outwardly facing surface (i.e., facing the outer flange 12) and may extend radially outwardly from the central bead seat surface 40 (or a central bead seat surface 240 of a bead seat 214 shown in FIG. 6C) (and, in an embodiment, extend perpendicular to the central axis A). FIG. 6A shows the same barb configuration shown in FIG. 5 for barbs 46' of beat seat 14'. In another embodiment of a bead seat 314 having a central bead seat surface 340 such as that shown in FIG. 6B, the first surface 352 of a barb 346 comprises a surface that is both axially outwardly-facing and radially-outwardly facing (i.e., facing away from the body of the wheel and the central bead seat surface 340). In yet another embodiment of a bead seat 414 having central bead seat surface 440 such as that shown in FIG. 6D, a first surface 452 of a barb 446 comprises a surface that is both axially outwardly-facing and radially inwardly-facing (i.e., facing towards the body of the wheel and the central bead seat surface 440). In such an embodiment, the first surface 452 may be convex or curved inwardly toward a second surface 456 of the barb 446 to form an undercut in the barb 446. In yet still another embodiment of a bead seat 514 having a central bead seat surface 540 such as that shown in FIG. 6F, a first surface 552 of a barb 546 may have substantially the same orientation as the first surface 52 of the embodiment illustrated in FIG. 5 and the first surface 252 of the embodiment illustrated in FIG. 6C, however, in this particular embodiment, rather than first and second surfaces 552, 556 of the barb 546 forming a point at an outer barb corner 554, the outer barb corner 554 is radiused or rounded-off. In any event, it will be appreciated that any number of generally sawtooth geometries may be used, and thus, the present disclosure is not intended to be limited to any particular sawtooth geometry.

Figure 6E:
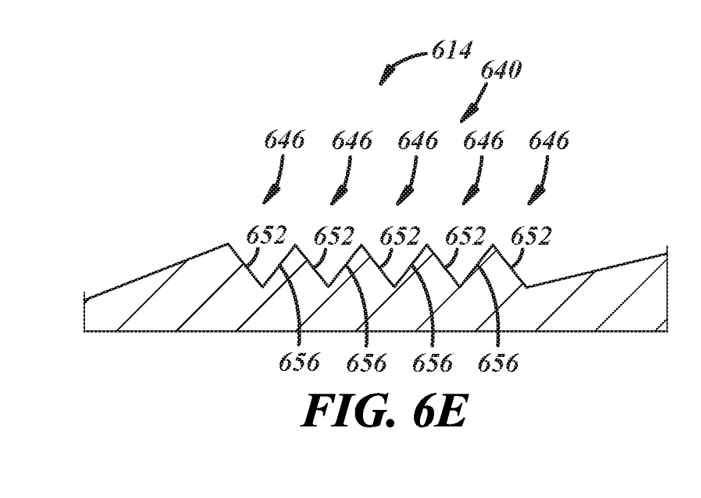
Figure 6F:
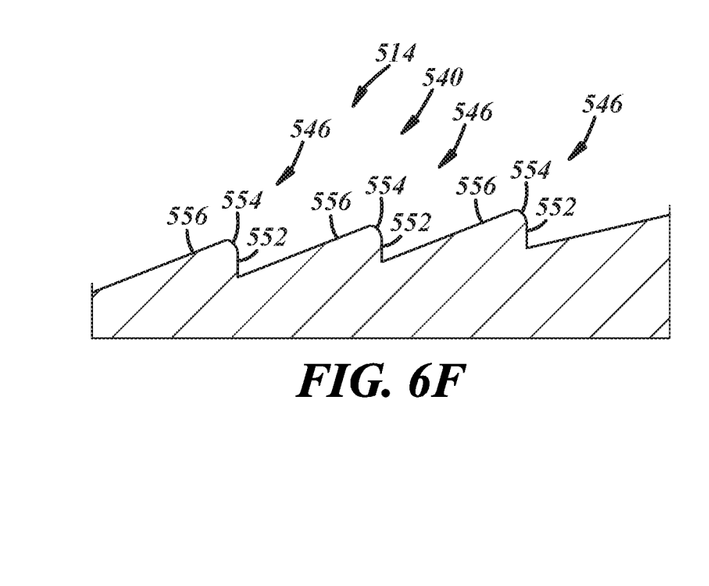

In another embodiment, one or more barbs 46 may have a geometry or cross-sectional shape other than a sawtooth geometry/shape. For example, in the embodiment of a bead seat 614 having a central bead seat surface 640 shown in FIG. 6E, at least one barb 646 may have a spike shape or triangular cross-sectional shape or geometry wherein the lengths of first and second surfaces 652, 656 of the barb 646 are equal and/or form an equilateral, equiangular, or isosceles triangle. In such an embodiment, first surface 652 of the barb 646 faces both axially outwardly (i.e., towards the outer flange 12) and radially outwardly, while the second surface 656 faces both axially inwardly (i.e., towards the retaining hump 16) and radially outwardly. In other embodiments, different barbs may have different geometries. For example, as shown in FIG. 6E, one or more barbs may have a sawtooth geometry where the first and second surfaces 652, 656 thereof have different lengths, whereas one or more other barbs may have a triangular shape.

In any event, it will be appreciated that the barbs 46 may have any number of geometries suitable for the purposes described herein. Further, in at least some embodiments, the bead seat 14 may also include one or more grooves or other projections that extend or project from the bead seat 14 in such a way as to prevent the disengagement of bead of the tire from the bead seat and possibly the movement of the bead over the retaining hump 16. Those skilled in the art will appreciate that such alternative geometries, shapes, and/or orientations of the barbs may also be used.

Various embodiments of a wheel with at least one barb within a bead seat has been disclosed. The barb(s) can project towards an outer flange of the wheel and/or may be positioned in a way so as to prevent a bead of a tire, when engaged with the wheel at the bead seat, from disengaging from the bead seat as a result of the bead of the tire being forced in an axially inward direction. The wheel with the barb(s) extending from the bead seat can be used in a variety of applications, as discussed above. Moreover, in at least one embodiment, the wheel with the barbed bead seat may prove particularly advantageous when operating a vehicle at high speeds and/or at lower tire pressures, or during other scenarios in which a relatively high amount of axial stress is applied to and between the bead of the tire and the bead seat of the wheel.

While the description above has been primarily with respect to bead seat 14 of the wheel 10, it will be appreciated that in at least some embodiments, both bead seat 14 and bead seat 14' will have one or more barbs extending or projecting therefrom. Accordingly, the present disclosure encompasses both embodiments wherein only one of bead seats 14, 14' have one or more barbs extending or projecting therefrom, and embodiments wherein both of beat seats 14, 14' have one or more barbs extending or projecting therefrom.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering any one or more of the following: "A"; "B"; "C"; "A and B"; "A and C"; "B and C"; and "A, B, and C."

The invention claimed is:

1. A vehicle wheel having a central axis, comprising:
a bead seat configured to engage a bead of a tire, the bead seat extending circumferentially about the central axis, and including:
a first sidewall;
a second sidewall; and
a base extending between the first and second sidewalls,
wherein the first and second sidewalls extend radially outwardly from the base, and
further wherein the base includes a radially outwardly-facing surface extending circumferentially about the central axis, and one or more barbs having a saw-tooth cross-sectional shape projecting from the radially outwardly-facing surface in both a radially outwardly direction and an axially inwardly direction, wherein each of the one or more barbs has a first surface and a second surface, and further wherein the first and second surfaces have different lengths with the first surface being longer than the second surface, and still further wherein the first surface faces in an axially outwardly direction and the second surface faces in the axially inwardly direction.

2. The vehicle wheel of claim 1, wherein at least one of the one or more barbs extends circumferentially about the central axis.

3. The vehicle wheel of claim 2, wherein the at least one of the one or more barbs extends circumferentially along the entirety of the radially outwardly-facing surface.

4. The vehicle wheel of claim 1, wherein the bead seat comprises a plurality of barbs, and further wherein two or more of the plurality of barbs are axially spaced from each other.

5. The vehicle wheel of claim 1, wherein the bead seat comprises a plurality of barb s, and further wherein two or more of the plurality of barb s are circumferentially spaced from each other.

6. The vehicle wheel of claim 1, wherein the bead seat comprises a plurality of barbs, and further wherein two or more of the plurality of barbs are both circumferentially and axially spaced from each other.

7. The vehicle wheel of claim 1, wherein the second sidewall of the bead seat includes an axially outwardly-facing bead seat surface, and further wherein the one or more barbs having the saw-tooth cross-sectional shape extends from the radially outwardly-facing surface of the bead seat toward the axially outwardly-facing bead seat surface of the second sidewall.

8. The vehicle wheel of claim 1, wherein the one or more barbs having the saw-tooth cross-sectional shape includes an outer barb corner at which the first and second surfaces meet, and wherein the outer barb corner points in an axially-inwardly direction.

9. The vehicle wheel of claim 1, wherein the bead seat is a first bead seat and the wheel includes a second bead seat axially spaced from the first bead seat and extend circumferentially about the central axis, the second beat seat comprising:
a first sidewall;
a second sidewall; and
a base extending between the first and second sidewalls,
wherein the first and second sidewalls extend radially outwardly from the base, and
further wherein the base includes a radially outwardly-facing surface extending circumferentially about the central axis, and one or more barbs projecting from the radially outwardly-facing surface in a radially outwardly direction.

10. A vehicle wheel having a central axis, comprising a bead seat configured to engage a bead of a tire, the bead seat extending circumferentially about the central axis, and including a radially outwardly-facing surface extending circumferentially about the central axis, and one or more barbs having a saw-tooth cross-sectional shape projecting from the radially outwardly-facing surface in both a radially outwardly direction and an axially inwardly direction, wherein each of the one or more barbs has a first surface and a second surface, and further wherein the first and second surfaces have different lengths with the first surface being longer than the second surface, and still further wherein the first surface faces in an axially outwardly direction and the second surface faces in the axially inwardly direction.

11. The vehicle wheel of claim 10, wherein the bead seat is a first bead seat and the vehicle wheel includes a second bead seat axially spaced from the first bead seat and extending circumferentially about the central axis, the second bead seat including a radially outwardly-facing surface extending circumferentially about the central axis, and one or more barbs projecting from the radially outwardly-facing surface in a radially outwardly direction.

12. The vehicle wheel of claim 10, wherein at least one of the one or more barbs extends circumferentially about the central axis.

13. The vehicle wheel of claim 12, wherein the at least one of the one or more barbs extends circumferentially along the entirety of the radially outwardly-facing surface.

14. The vehicle wheel of claim 10, wherein the bead seat includes a plurality of barbs projecting from the radially outwardly-facing surface, and further wherein two or more of the plurality of barbs are axially spaced from each other.

15. The vehicle wheel of claim 10, wherein the bead seat includes a plurality of barbs projecting from the radially outwardly-facing surface, and further wherein two or more of the plurality of barbs are circumferentially spaced from each other.

16. The vehicle wheel of claim 10, wherein the bead seat includes a plurality of barbs projecting from the radially outwardly-facing surface, and further wherein two or more of the plurality of barbs are both circumferentially and axially spaced from each other.

17. The vehicle wheel of claim 10, wherein the one or more barbs includes an outer barb corner at which the first and second surfaces meet, and wherein the outer barb corner points in an axially-inwardly direction.

\* \* \* \* \*